US012160738B2

(12) United States Patent
Brown et al.

(10) Patent No.: US 12,160,738 B2
(45) Date of Patent: Dec. 3, 2024

(54) WIRELESS TELECOMMUNICATIONS NETWORK AUTHENTICATION

(71) Applicant: British Telecommunications Public Limited Company, London (GB)

(72) Inventors: Ruth Brown, London (GB); Paul Wright, London (GB)

(73) Assignee: British Telecommunications Public Limited Company (GB)

( * ) Notice: Subject to any disclaimer, the term of this patent is extended or adjusted under 35 U.S.C. 154(b) by 264 days.

(21) Appl. No.: 17/754,259

(22) PCT Filed: Sep. 28, 2020

(86) PCT No.: PCT/EP2020/077124
§ 371 (c)(1),
(2) Date: Mar. 29, 2022

(87) PCT Pub. No.: WO2021/063896
PCT Pub. Date: Apr. 8, 2021

(65) Prior Publication Data
US 2022/0360987 A1 Nov. 10, 2022

(30) Foreign Application Priority Data
Oct. 2, 2019 (EP) .................................... 19201209

(51) Int. Cl.
*H04W 12/069* (2021.01)
(52) U.S. Cl.
CPC ................ *H04W 12/069* (2021.01)
(58) Field of Classification Search
None
See application file for complete search history.

(56) References Cited

U.S. PATENT DOCUMENTS

| 7,735,126 B2 | 6/2010 | Zhang et al. |
| 2005/0008159 A1 | 1/2005 | Grilli et al. |

(Continued)

FOREIGN PATENT DOCUMENTS

| CN | 102934470 A | 2/2013 |
| CN | 104412633 A | 3/2015 |

(Continued)

OTHER PUBLICATIONS

International Preliminary Report on Patentability received for PCT Patent Application No. PCT/EP2020/077124, mailed on Apr. 14, 2022, 12 pages.

(Continued)

*Primary Examiner* — Brandon Hoffman
(74) *Attorney, Agent, or Firm* — PRANGER LAW PC

(57) ABSTRACT

A method of authenticating User Equipment (UE) to a wireless telecommunications network, wherein the UE is subscribed to a first wireless telecommunications network, and authenticating being performed so as to subscribe the UE to a second wireless telecommunications network, and wherein there is an absence of a roaming capability between the first wireless telecommunications network and the second wireless telecommunications network for the UE, the method including generating, at the first wireless telecommunications network, a network key for authenticating the UE at the second wireless telecommunications network; loading the generated network key to the second wireless telecommunications network; subsequently communicating the generated network key to the UE from the first wireless telecommunications network; and authenticating the UE at the second wireless telecommunications network by communicating the network key from the UE to the second wireless telecommunications network, thereby to permit the (Continued)

UE to subscribe to the second wireless telecommunications network.

14 Claims, 4 Drawing Sheets

(56) References Cited

U.S. PATENT DOCUMENTS

| | | |
|---|---|---|
| 2011/0013117 A1 | 1/2011 | Egi et al. |
| 2011/0130117 A1 | 6/2011 | Fan et al. |
| 2011/0235802 A1 | 9/2011 | Kokkinen et al. |
| 2013/0013923 A1 | 1/2013 | Thomas et al. |
| 2015/0074782 A1 | 3/2015 | Zhang et al. |
| 2019/0174449 A1* | 6/2019 | Shan ................. H04W 60/04 |

FOREIGN PATENT DOCUMENTS

| | | |
|---|---|---|
| EP | 2448301 A1 | 5/2012 |
| WO | WO-2007139883 A2 | 12/2007 |
| WO | 2014146679 A1 | 9/2014 |
| WO | 2016160256 A1 | 10/2016 |
| WO | WO-2019062384 A1 | 4/2019 |
| WO | WO-2019179925 A1 * | 9/2019 ............. H04L 63/08 |

OTHER PUBLICATIONS

Office Action received for Chinese Patent Application No. 201980020479.6, mailed on Jan. 6, 2022, 12 pages (7 pages of English Translation and 5 pages of Official Copy).
Office Action received for Chinese Patent Application No. 201980020479.6, mailed on Jun. 8, 2022, 9 pages (5 pages of English Translation and 4 pages of Official Copy).
Office Action received for European Patent Application No. 19709981.5, mailed on Jul. 11, 2022, 9 pages.
Combined Search and Examination Report under Sections 17 and 18(3) for Great Britain Application No. 1914256.1 mailed on Mar. 26, 2020, 6 pages.
Extended European Search Report for Application No. 19201209.4, mailed on Mar. 11, 2020, 12 pages.
International Search Report and Written Opinion for Application No. PCT/EP2020/077124, mailed on Oct. 21, 2020, 15 pages.
Stellarix, "Novelty Search Report—A33899—Mobile Key Management," Sep. 16, 2019, 32 pages.

* cited by examiner

WIRELESS TELECOMMUNICATIONS NETWORK AUTHENTICATION

PRIORITY CLAIM

The present application is a National Phase entry of PCT Application No. PCT/EP2020/077124, filed Sep. 28, 2020, which claims priority from EP Patent Application No. 19201209.4, filed Oct. 2, 2019, each of which is hereby fully incorporated herein by reference.

TECHNICAL FIELD

The present disclosure relates to a method of authenticating a device on a wireless telecommunications network and to a telecommunications network therefor.

BACKGROUND

Wireless telecommunications networks are typically managed by a Mobile Network Operator (MNO). A wireless telecommunications device can be registered as a subscriber to a telecommunications network provided by a given MNO. The telecommunications network to which the device is subscribed is typically referred to as the "home network" for that device.

It is often desirable for a device to be able to connect to telecommunications networks other than its home network, for example to access resources available on those networks; these other networks may generally be referred to as "guest networks".

Roaming is a known approach to enable a device to access a guest network. Roaming is facilitated through the provision of roaming agreements, which are agreements between MNOs of different telecommunications networks that enable subscribers of one telecommunications network managed by a first MNO to communicate over, or access, another telecommunications network managed by a second MNO.

FIG. 1 is a diagram showing an example roaming architecture for two telecommunications networks 100 and 102. In this example, each telecommunications network is a Long-Term Evolution (LTE) network. Network 100 is managed by a first MNO-MNO1, and network 102 is managed by a second MNO-MNO2. Devices 104 and 106 (also referred to User Equipment (UE)) located within network 102 are subscribers to network 100; that is, network 100 is the home network for devices 104 and 106. Devices 104 and 106 therefore include a subscriber identity module (SIM) provisioned by MNO1. The roaming agreement between MNO1 and MNO2 enables devices 104 and 106 to access guest network 102 using access credentials provisioned by the MNO1.

Though roaming agreements enable a device to access a guest network using a single SIM provisioned by the device's home network MNO, roaming suffers from the drawback of requiring interconnections between the telecommunications networks between which roaming is to occur. Such interconnections are shown in FIG. 1 at 108, land 112. Interconnection 108 is an S6a interface between a Mobility Management Entity (MME) 114 of the guest network and the Home Subscriber Server (HSS) 116 of the home network. Interconnection 1 is an S8 interface between a Serving GateWay (SGW) 118 of the guest network and a Packet Data network GateWay (PGW) 120. Interconnection 112 is an S9 interface between a Policy and Charging Rules Function (PCRF) 122 of the guest network and the PCRF 124 of the home network. If there are no interconnections between two telecommunications networks, roaming cannot be implemented to enable a device to access a guest network.

Another approach to enable a device to access networks other than its home network is International Mobile Subscriber Identity (IMSI) switching. The IMSI is used to identify the device of a communication network. It is a unique identification for the device within all wireless telecommunications networks. IMSI switching refers to switching the IMSI for the device's home network over to a different IMSI for a second network. That is, IMSI switching requires that multiple IMSIs be stored on a single SIM. Once the IMSI has been switched to the IMSI for the second network, the device is able to access that second network. IMSI switching may be controlled by 1a SIM application. Problematically, IMSI switching can be triggered when no network coverage for the device's home network is detected, such that IMSI switching has the risk that the SIM application switches the IMSI when undesired (e.g., in rural spots, underground, in lifts etc.).

Another approach to enable a device to access guest networks is the use of roaming hubs. A roaming hub enables a device to access a guest network through the hub. That is, the roaming hub has a roaming agreement with the guest network. By connecting to the hub, the device can then access the guest network. Though roaming hubs do not require a roaming agreement between the device's home network and the guest network, they do still require an interconnection between the roaming hub and the guest network.

SUMMARY

It is an aim of the present disclosure to at least alleviate some of the aforementioned problems.

According to a first aspect of the disclosure, there is provided a method of authenticating User Equipment (UE) to a wireless telecommunications network, wherein the UE is subscribed to a first wireless telecommunications network, and authenticating being performed so as to subscribe the UE to a second wireless telecommunications network, and wherein there is an absence of a roaming capability between the first wireless telecommunications network and the second wireless telecommunications network for the UE, the method comprising generating, at the first wireless telecommunications network, a network key for authenticating the UE at the second wireless telecommunications network; loading the generated network key to the second wireless telecommunications network; subsequently, communicating the generated network key to the UE from the first wireless telecommunications network; and authenticating the UE at the second wireless telecommunications network by communicating the network key from the UE to the second wireless telecommunications network, thereby to permit the UE to subscribe to the second wireless telecommunications network.

In some embodiments, there is an absence of a roaming interface, for example an S6a, S8 and/or S9 interface/s, and/or a roaming agreement between the first and the second networks.

In some embodiments, the method further comprises receiving a request from the UE to subscribe to the second wireless telecommunications network, in response to which said authenticating is performed.

In some embodiments, communicating the generated network key to the UE is performed by a System Information Broadcast (SIB), such as by a SIB1 message. Optionally, the SIB1 message and/or a subsequent SIB1 message comprises: identification information of the second network and/or identification information of the UE.

In some embodiments, the network key is encrypted when communicated to the UE. Optionally, the network key is encrypted using unique identifier associated with the UE, and the encryption may be performed by the first network. Optionally, the unique identifier is: an IMEI; an IMSI; a MSISDN; and/or biometric user information of a user associated with the UE.

In some embodiments, the UE comprises an application for decrypting the network key. Optionally, the application is authorized to write the network key to a Subscriber Identify Module of the UE, and wherein the first and/or second wireless telecommunications network/s provides the authorization.

In some embodiments, the network key is only generated by the first wireless telecommunications network.

In some embodiments, the network key is only communicated: to the second telecommunications network from the first telecommunications network; and to the UE from first the telecommunications network. In some embodiments, the network key is not communicated to the UE by the second telecommunications network.

In some embodiments, the network key is separately available to both the UE and the second telecommunications network when authenticating the UE onto the second wireless telecommunications.

In some embodiments, the second network key is only communicated to the second telecommunications network from the UE having loaded the network key to the second wireless telecommunications network.

In some embodiments, the second network key is configured to expire after a predetermined period without use to authenticate the UE with the second telecommunications network.

In some embodiments, the network key is generated from a unique identifier associated with the UE.

In some embodiments, the network key is generated from a further network key for authenticating the UE onto the first telecommunications network.

In some embodiments, the network key is stored within a Subscriber Identity Module (SIM) associated with the UE, and wherein the Subscriber Identity Module comprises a plurality of different fields for storing a plurality of network keys. Preferably, the UE comprises only a single SIM, and wherein said single SIM is available to permit the UE to connect to both the first and second wireless telecommunications networks.

In some embodiments, the network key is loaded onto the second wireless telecommunications network via an interface between the first wireless telecommunications network and the second wireless telecommunications network. Optionally, the network key is extracted from the first wireless telecommunications network and loaded (for example, manually) to the second wireless telecommunications network. Optionally, the network key is loaded onto the second wireless telecommunications network via a wired connection. Optionally, the network key is loaded onto the second wireless telecommunications via a portable memory device.

In some embodiments, the method further comprises communicating an instruction to the UE to prioritize subscription to the second wireless telecommunications network over the first wireless telecommunications network, for example, as performed by means of a SIBS message.

In some embodiments, the first telecommunications network is a public telecommunications network, and the second telecommunications network is a private telecommunications network.

In some embodiments, the first telecommunications network and the second telecommunications network are wide area cellular networks.

According to another aspect of the disclosure, there is provided a wireless telecommunications system comprising: a first wireless telecommunication network; a User Equipment (UE) subscribed to the first wireless communication network; and a second wireless communication network, wherein there is an absence of a roaming capability between the first wireless telecommunications network and the second wireless telecommunications network for the UE; wherein the first wireless telecommunication network comprises a processor configured to: generate a network key for authenticating the UE at the second wireless telecommunications network; wherein the second wireless telecommunication network comprises a processor configured to: receive the generated network key from the first wireless telecommunication network; and subsequently, to receive the generated network key from UE, thereby to authenticate the UE at the second wireless telecommunications network so as to permit the UE to subscribe to the second wireless telecommunications network.

The invention extends to any novel aspects or features described and/or illustrated herein. The invention extends to methods and/or apparatus substantially as herein described and/or as illustrated with reference to the accompanying drawings. The disclosure also provides a computer program and a computer program product for carrying out any of the methods described herein and/or for embodying any of the apparatus features described herein, and a computer readable medium having stored thereon a program for carrying out any of the methods described herein and/or for embodying any of the apparatus features described herein.

The disclosure also provides a signal embodying a computer program for carrying out any of the methods described herein and/or for embodying any of the apparatus features described herein, a method of transmitting such a signal, and a computer product having an operating system which supports a computer program for carrying out any of the methods described herein and/or for embodying any of the apparatus features described herein.

Any apparatus feature as described herein may also be provided as a method feature, and vice versa. As used herein, means plus function features may be expressed alternatively in terms of their corresponding structure, such as a suitably programmed processor and associated memory.

Any feature in one aspect of the disclosure may be applied to other aspects of the disclosure, in any appropriate combination. In particular, method aspects may be applied to apparatus aspects, and vice versa. Furthermore, any, some and/or all features in one aspect can be applied to any, some and/or all features in any other aspect, in any appropriate combination. It should also be appreciated that particular combinations of the various features described and defined in any aspects of the invention can be implemented and/or supplied and/or used independently.

In this specification the word 'or' can be interpreted in the exclusive or inclusive sense unless stated otherwise.

Furthermore, features implemented in hardware may generally be implemented in software, and vice versa. Any reference to software and hardware features herein should be construed accordingly.

BRIEF DESCRIPTION OF THE DRAWINGS

The invention extends to a method of authenticating User Equipment and to a system therefor as described herein and/or substantially as illustrated with reference to the accompanying drawings. The present disclosure is now described, purely by way of example, with reference to the accompanying diagrammatic drawings, in which.

DESCRIPTION

The present disclosure is directed to a method for enabling a telecommunications device (herein also referred to as "User Equipment" or "UE") that is subscribed to a first wireless telecommunications network to access a second wireless telecommunications network, wherein there is an absence of roaming capabilities, for example due to an absence of appropriate interconnections and/or a roaming agreement between the first and the second networks.

In overview, to facilitate improved authentication of the UE on to the second network, network keys are pre-loaded to the second network from the first network and are communicated by the home network to the telecommunications device, such that the second network is capable of authenticating the telecommunications device.

In order for the second network to facilitate authentication of the UE, the second network and the UE each have network keys, which comprise pre-shared authentication keys, K, as outlined in 33GPP Technical Specification 35.205, the contents of which are herein incorporated by reference.

Following an initial authentication process, a copy of the network key is communicated from the UE to a node within the second network for use in subsequent attachment procedures, and the network key for the second network is stored against identification information for the UE.

As will be explained in more detail below, the process described herein helps enable a UE with a single SIM to access a guest network where there is no roaming capability with its home network, all whilst maintaining a secure authentication process.

In more detail, examples of a process for authenticating a UE on a guest network will now be described with reference to FIGS. 2 to 4; these are described in the context of Long Term Evolution (LTE) networks for the purposes of illustration only, and the following techniques, approaches and examples are applicable within different types of wireless telecommunications networks.

Figure 1:
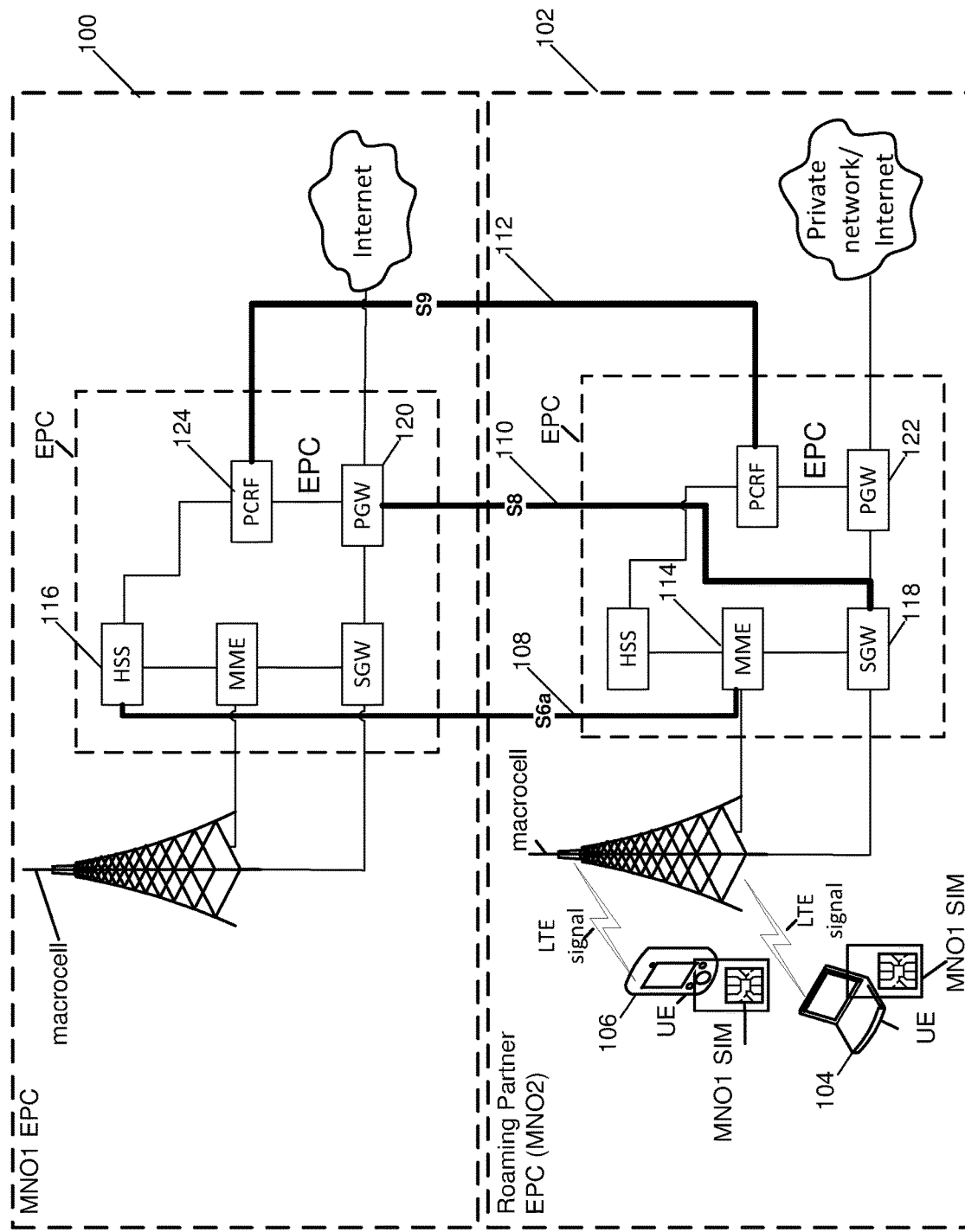
FIG. 1 shows an example of two wireless telecommunications networks with a roaming agreement.
Figure 2:
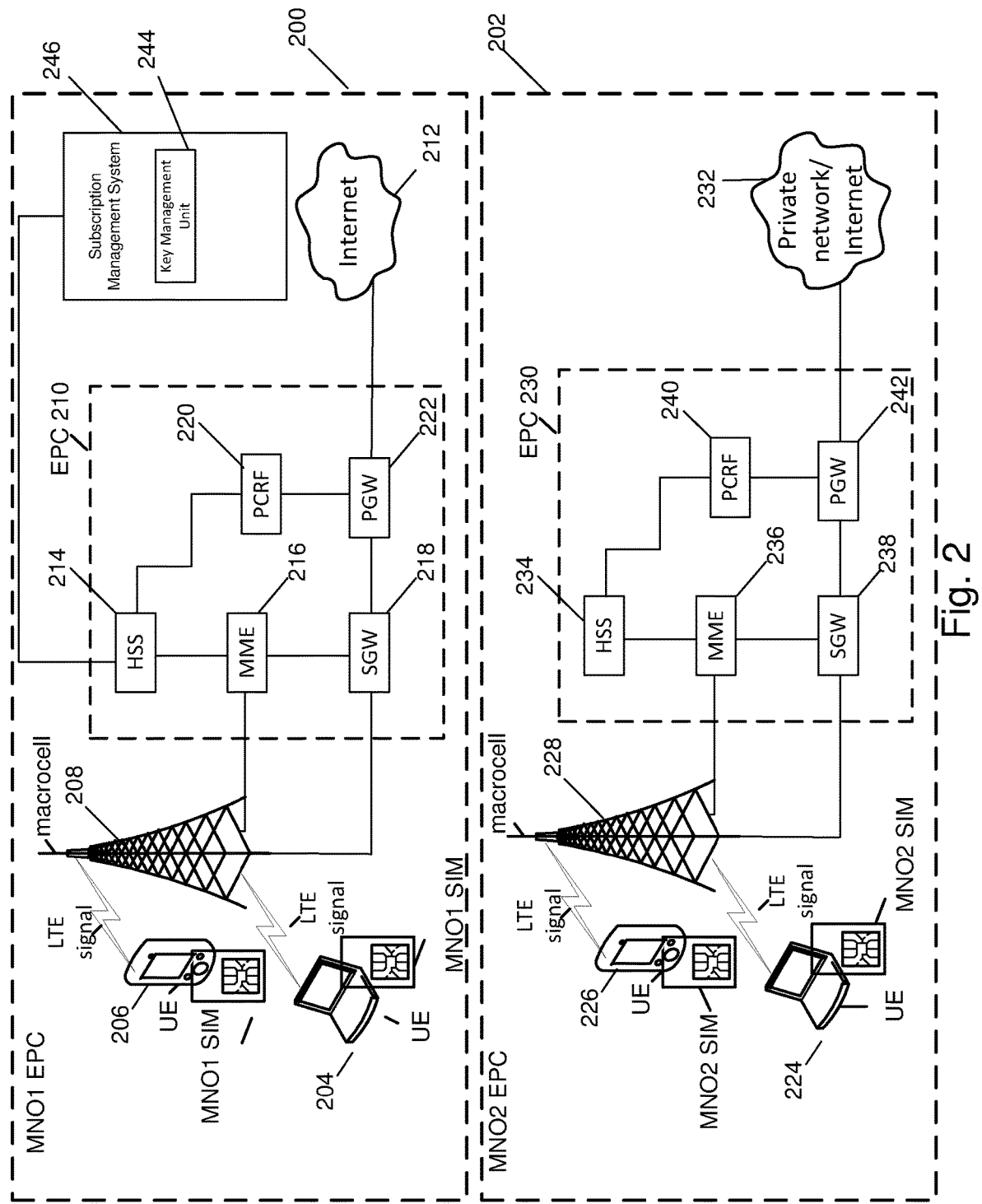
FIG. 2 shows an example of two wireless telecommunications networks without roaming capability.

FIG. 2 shows a first wireless telecommunications network 200 and a second wireless telecommunications network 202. Network 200 is managed by a first MNO, MNO1. Network 202 is managed by a second MNO, MNO2. There is no roaming capability between networks 200 and 202, thus there are no working interconnections or interfaces between the two networks and/or agreements for facilitating roaming. For the purpose of illustration, network 200 is taken to be a public network, and network 202 is taken to be a private network. Generally speaking, a public network is one which is open for general use, and a private network is one that can only be accessed by select devices set by the owner (e.g. the mobile network operator) of the network.

Networks 200 and 202 are in this example both LTE networks. The network 200 comprises a User Equipment (UE) 204 and 206, an eNodeB 208, and an evolved network core (EPC) 210. The EPC connects to an external packet data network 212, which in the example illustrated here is the internet.

UEs may be any suitable type of device capable of participating in wireless communications. A UE could be, for example, a mobile phone, smartphone, laptop, PC, tablet, etc. In the example shown here, UE 206 is a mobile device, and UE 204 is a laptop. A UE may be referred to interchangeably herein as a device.

UEs 204 and 206 are subscribers to network 200 (i.e. network 200 is the home network for UEs 204 and 206). Consequently, UEs 204 and 206 are shown as including a SIM provisioned by MNO1.

Figure 3:
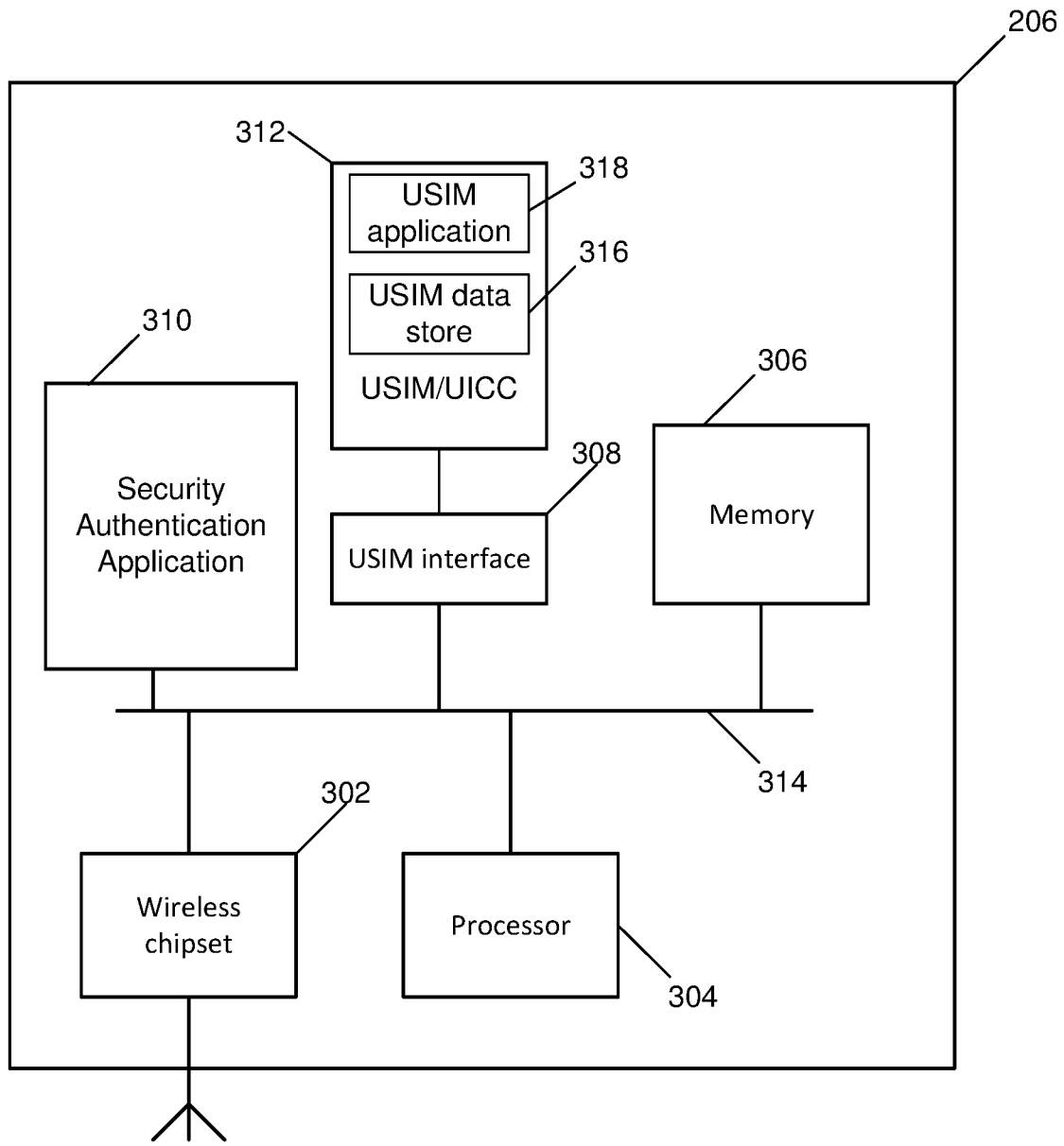
FIG. 3 shows components of a User Equipment.

FIG. 3 shows an example architectural layout of various components of a UE. For the purpose of illustration, FIG. 3 shows the components of UE 206, though other UEs may have similar components.

The UE 206 comprises a wireless chipset 302, a processor 304, memory 306, a Universal Subscriber Identity Module (USIM) 312, a USIM interface 308, and a Security Authentication Application 310. These components are connected by interconnect circuitry 314, such as a bus.

The wireless chipset 302 manages the transmission and reception of wireless messages from and to the UE 206. Processor 304 performs general processing functions for the UE 206. Memory 306 is configured to store data for the UE 206 (though only a single memory block is shown in FIG. 3, it will be appreciated that memory block 306 corresponds to one or more separate blocks of memory of the same or different types, such as RAM and/or ROM).

The USIM 312 is an example of an identification module, which stores identification information for the device along with at least one network key for the device (such as for the home network 200).

The identification information stored on the USIM 312 (and specifically on the USIM data store 316) comprises: an International Mobile Equipment Identity (IMEI); IMSI; and/or Mobile Station International Subscriber Directory Number (MSISDN).

The data store 316 comprises a hierarchical memory structure. For example, the data store 316 hierarchical file system includes a Master File (MF), one or more Dedicated Files (DF) and one or more Elementary Files (EF). The one or more DFs sit below the MF (i.e. they are subordinate files to the MF). The EFs sit below the DFs. One or more EFs may sit below each DF. In general, the EFs store the data for a SIM. Thus, in one example, the IMEI, IMSI, MSISDN and/or biometric information are stored in EFs.

At least one network key is stored within the USIM 312, and each network key is associated with a network (e.g. the home network 200) that uses the at least one network key to identify the USIM uniquely and to authenticate the UE. The network key comprises an authentication key K and a unique operator code Opc.

The authentication key K is unique to the USIM, which is assigned by the network operator (e.g. MNO1), and is used for authenticating the UE on the network with which K is associated. The associated network also stores a corresponding copy of K, such as in HSS 214 or in an authentication center (AuC) (for conciseness, not shown in FIG. 2) in the case of the home network 200. Authentication key K may also be referred to as a USIM Individual key (e.g. as per 3GPP Technical Specification 31.102); a permanent key (e.g. as per 3GPP Technical Specification 33.401); or a long-term secret key shared between the USIM and AuC (e.g. as per 3GPP Technical Specification 33.102).

The unique operator code Opc is derived from a network-operator-specific code Op and the unique authentication key K. As such, the code Opc is also unique to the UE 206. The code Opc is also used to identify and authenticate the UE 206 on the home network 200.

The at least one network key is stored in a secure region of memory in the USIM 312 (for conciseness, not shown in FIG. 3), which is encrypted and comprises an area that is tamper-proof from external entities (i.e. entities external of the USIM, such as other components of the UE 206 including the USIM interface 308). Thus, the secure region of memory is an externally-unreadable region of memory. Accordingly, the network key is irretrievable from the region of memory in which it is stored by applications and components external to the USIM 312. The secure region is, however, accessible (e.g. readable) by the USIM application 318. The USIM application 318 accesses the network keys in the secure region so as to create session keys during an attachment procedure. The USIM 312 also includes a USIM application 318, which runs on the SIM to perform the various functions of the USIM 312.

The USIM 312 runs on, or form part of, a Universal Integrated Circuit Card (UICC) smartcard (for conciseness, not shown in FIG. 3). The UICC smartcard is embedded within the UE 206 (i.e. fixed within the device). Alternatively, the UICC smartcard is insertable into UE 206, but is capable of being removed from the UE 206. In other words, the UICC is removable.

The USIM 312 is connected to the other components of the UE 206 through the USIM interface 308. The USIM interface 308 can control how data stored on the USIM 312 (except within the secure region of memory) is retrieved from the USIM 312. In other words, the USIM interface 308 controls access to the data stored on the USIM 312.

The Security Authentication Application is in communication with the wireless chipset 302 via bus 314. The Security Authentication Application is configured to decrypt network keys that are received by the UE 206, for example from network 200. To do so, the Security Authentication Application is configured to receive the encrypted network key and information for decrypting the network key, such as the IMEI, MSISDN, IMSI and/or biometric information associated with the UE. Once decrypted, the network key is communicated by the Security Authentication Application to the USIM 312, in which the Security Authentication Application is granted special read and write privileges for the USIM in relation to the network key, such privileges being granted by MNO1.

It will be appreciated that a UE is available to include additional components to those shown in FIG. 3, and that only a selection of components has been illustrated and described for the purpose of conciseness.

Referring back to FIG. 2, the eNodeB 208 is an example of a base station and operates to connect the UEs to the EPC 210. The EPC 2 comprises: a Mobility Management Entity (MME) 216; a Serving GateWay (SGW) 218; a Packet data network GateWay (PGW) 222; a Policy Charging and Rules Function (PCRF) unit 2 and a Home Subscriber Server (HSS) 214 (each also referred to as a "node").

Network 202 comprises UEs 224 and 226, an eNodeB 228, and an evolved network core (EPC) 230. The EPC 2 connects to an external packet data network 232, which in the example illustrated here is a private network.

UEs 224 and 226 are subscribers to network 202 (i.e. network 202 is the home network for UEs 224 and 226). Consequently, UEs 224 and 226 are shown as including a SIM provisioned by MNO2.

EPC 2 includes an HSS 234, an MME 236, an SGW 238, a PCRF 240 and a PGW 242.

A brief overview of the components within the EPC will now be described. It will be appreciated that this overview applies equivalently to the components of EPC2 and 230.

The MME operates to process the signaling between the UEs and the EPC. The MME also operates to select an SGW for a UE during an initial attachment, and to select a PGW. The SGW is responsible for controlling handovers of the UE to neighboring eNodeBs.

The SGW may also retain information on the bearers when a UE is an idle state. It can buffer downlink data while the MME operates to re-establish a bearer. The SGW also functions as a router between the eNodeB and the PGW.

The PGW operates to provide connectivity between the UE and an external Public Data Network (PDN). It is the point of entry to or exit from the LTE network of data packets for the UE.

The HSS contains subscription data for users of the network, including information about PDNs a UE is permitted to connect. The HSS also stores the identity of the MME to which the UE is currently attached, or registered.

The PCRF performs policy control and decision making and provides QoS authorization for UEs participating in communication sessions and manage data flows in accordance with a user's subscription profile.

Network 200 further comprises a Key Management Unit (KMU) 244. The KMU operates to generate network keys for a UE for a given network, including for networks 200 and 202. In the example illustrated in FIG. 2, the KMU 244 is included within a Subscription Management 1 System (SuMS) 246. The SuMS 244 is communicatively coupled to the HSS 214 via a secure link (wired and/or wireless). The SuMS 246 (and hence the KMU 244) is(/are) shown as being external to the EPC 210. In other implementations, the SuMS 246 and KMU 244 is included within the EPC 210.

An approach to enable a UE comprising only a single SIM to connect to a guest network with which there is an absence of any roaming agreement between the guest network and the home network of the UE will now be described with reference to the flowchart shown in FIG. 4, the UE 206 shown in FIG. 3 and the networks shown in FIG. 2.

Because in this example the network 202 is a private network, the network key for network 202 is herein also referred to as the "private network key".

At 402, a private network key is generated for UE 206 for the private network 202; this private network key is generated by a trusted authority, and the trusted authority is pre-selected by the private network 202. In this example, the trusted authority is the home network 200 (which is, in this example, the home network of UE 206).

A node (e.g. the SuMS 246) of the home network 200 receives the identification information and identifying information for the private network 202 (e.g. a Public Land Mobile Network (PLMN) name) from the UE 206 (e.g. having been communicated via a secure portal, for example a secure webpage). The generating of the private network key is then performed by the KMU 244. Once generated, the private network key is stored in HSS 214.

In 402, the network key is then delivered from the home network 200 to the private network 202, and in particular to HSS 234; this is performed via a secure and trusted interface between the HSS 214 and HSS 234 or via a communication from an agent for the home network that is then uploaded by an agent for the private network.

At 406, the private network key is then encrypted and loaded into a SIB1 message that is then communicated to the UE 206 from the home network.

At 406, the home network 200 (in particular from the KMU 244) is also available to communicate additional information to the UE 206 (via the SIB1 message or via subsequent messaging), including: identification information of the private network 202 and/or identification information of the UE 206 in the private network 202. The identification information of the private network 202 includes a Home Public Land Mobile Network (HPLMN) code for the private network 202 (denoted as pHPLMN). The identification information for the UE 206 in the private network 202 is an identification code for the UE 206. Because there is no roaming agreement between networks 200 and 202, the IMSI for the UE 206 in network 202 (pIMSI) may differ to that in the network 200.

Once the UE 206 receives the SIB1 message 408, the message is decrypted by the Security Authentication Application 3 so as to extract the private network key, which is then securely communicated to the USIM 312 of the UE 206 and written into the USIM data store 316.

Upon receipt of the private network key, the UE 206 effectively has dual SIM identity: a first SIM identity for the home network 200, and a second SIM identity for the network 202.

Storage of the private network key (and the identification information) within the USIM 312 is facilitated by the provision of additional storage fields within the USIM 312, so as to prevent overwriting of other network keys. For example, compared to conventional USIMs, USIM 312 includes additional Elementary File (EF) fields to store additional keys (and identification information). These additional EF fields are stored within data store 316. The USIM 312 therefore comprises a first additional EF for storing the private network key, a second additional EF for storing the network code identifying private network 202, and a third additional EF for storing the identification code for the UE 206 within the private network 202.

At 410, the UE 206 subsequently attempts registration with the private network 202 by communicating the private network key stored on the USIM 312 to the private network 202, and the authentication of the UE is performed by the private network using the private network key that was pre-loaded into HSS 234 at 402.

By providing the private network key to the UE 206 and private network 202 via separate secure channel, this allows single-attempt authentication of the UE 206 by the private network 202.

Once the UE 206 is authenticated and registered with the private network, it is then permitted to utilize the private network 202.

The above examples have been illustrated in the context of LTE networks. Consequently, the device's SIM has been described as a USIM. In other examples, one or both of the networks 200 and 202 may be a different type of network, such as a GSM or UMTS network. The device's SIM need not be a USIM, but could be a SIM card. The term 'SIM' has been used herein to refer generally to these different types of SIM.

Though some of the operations above have been described as being performed by particular nodes of the network, it will be appreciated that the operations could be performed by any suitable network node. For example, each operation described above as being performed by an HSS may be performed by an authentication center (AuC).

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present disclosure may consist of any such individual feature or combination of features. In view of the foregoing description it will be evident to a person skilled in the art that various modifications may be made within the scope of the invention.

Alternatives and Modifications

In the examples described above, network 202 is a private network, and this network is available to be of any suitable size, for example, consisting of one or more small cells and/or one or more macrocells. In other examples, the network 202 is not private network but another public network that is not the home network of UE 206.

In one example, the USIM 312 stores a flag that indicates the UE 206 is permitted to access the private network 202 (subject to authentication), and for example, the flag indicates that the USIM 312 has a dual SIM identity, including one for the private network 202. In particular, this flag is stored within an additional EF field.

Figure 4:
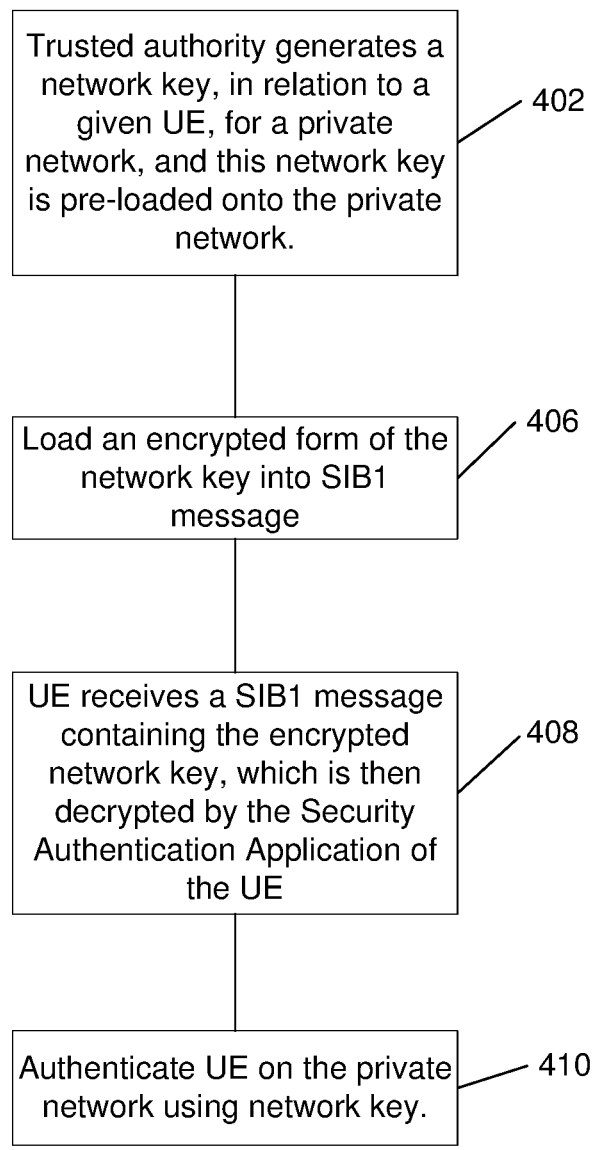
FIG. 4 shows a process for authenticating the User Equipment in the context of the networks of FIG. 2.

In an alternative, the process of FIG. 4 is run if the UE 206 has opted into the process, for example as denoted by the flag.

In an alternative, the KMU 244 (and potentially also the SuMS 246) is included within the HSS 214, in which case the KMU 244 is separated from the storage and repository functionality of the HSS 214. For example, repositories within the HSS 214 are accessed by the KMU 244 through an API.

In one example, each private network key is generated by the KMU 244 from a home network 1 key by implementing a mathematical algorithm upon the home network key (which in turn is derived from identification information of a UE). In an alternative example, each private network key is generated by multiplying a home network key by a random number. As yet another example, a hashing function is implemented to generate a hash value from a home network key, and the generated hash value is the private network key. In other examples, a series of mathematical functions are applied to a home network key to generate the private network key. In one example, each private network key is of the same bitlength (i.e. contains the same number of bits) as the home network key from which it was generated.

Accordingly, the KMU 244 retrieves the device's home network keys using the identification information for the UE 206 received at 402. For example, the KMU 244 identifies and accesses the device's stored profile using the information identifying the UE 206 received at 402 to retrieve the home network keys. Once the home network keys for the UE 206 have been retrieved, the KMU 244 can derive the private network keys for the UE 206. This approach therefore enables the private network keys to be generated without requiring the home network keys to be shared externally of the network 200.

In an alternative, at or following 406, the home network issues a SIB communication to the UE so as to promote the priority of the private network above that of the home network.

In one example, for security, the private network key is provided with expiry time, such that they key is only valid if used within a predefined period of time (e.g. 30 minute).

Each feature disclosed in the description, and (where appropriate) the claims and drawings may be provided independently or in any appropriate combination.

Reference numerals appearing in the claims are by way of illustration only and shall have no limiting effect on the scope of the claims.

The invention claimed is:

1. A method of authenticating User Equipment (UE) to a wireless telecommunications network, wherein the UE is subscribed to a first wireless telecommunications network, and authenticating is performed so as to subscribe the UE to a second wireless telecommunications network, and wherein there is an absence of a roaming capability between the first wireless telecommunications network and the second wireless telecommunications network for the UE, the method comprising:
   generating, at the first wireless telecommunications network, a network key for authenticating the UE at the second wireless telecommunications network;
   loading the generated network key to the second wireless telecommunications network;
   subsequently, communicating the generated network key to the UE from the first wireless telecommunications network by a System Information Broadcast (SIB); and
   authenticating the UE at the second wireless telecommunications network by communicating the network key from the UE to the second wireless telecommunications network, thereby to permit the UE to subscribe to the second wireless telecommunications network.

2. The method according to claim 1, wherein the network key is encrypted when communicated to the UE.

3. The method according to claim 1, wherein the network key is only generated by the first wireless telecommunications network.

4. The method according to claim 1, wherein the network key is only communicated:
   to the second wireless telecommunications network from the first wireless telecommunications network; and
   to the UE from the first wireless telecommunications network.

5. The method according to claim 1, wherein, the network key is separately available to both the UE and the second wireless telecommunications network when authenticating the UE onto the second wireless telecommunications.

6. The method according to claim 1, wherein, the network key is only communicated to the second wireless telecommunications network from the UE having loaded the network key to the second wireless telecommunications network.

7. The method according to claim 1, wherein the network key is configured to expire after a predetermined period without use to authenticate the UE with the second wireless telecommunications network.

8. The method according to claim 1, wherein the network key is generated from a unique identifier associated with the UE.

9. The method according to claim 1, wherein the network key is generated from a further network key for authenticating the UE onto the first wireless telecommunications network.

10. The method according to claim 1, wherein the network key is stored within a Subscriber Identity Module (SIM) associated with the UE, and wherein the SIM comprises a plurality of different fields for storing a plurality of network keys.

11. The method according to claim 1, wherein the network key is loaded onto the second wireless telecommunications network via an interface between the first wireless telecommunications network and the second wireless telecommunications network.

12. The method according to claim 1, further comprising communicating an instruction to the UE to prioritize subscription to the second wireless telecommunications network over the first wireless telecommunications network.

13. The method according to claim 1, wherein the first wireless telecommunications network is a public telecommunications network, and the second wireless telecommunications network is a private telecommunications network.

14. A wireless telecommunications system comprising:
   a first wireless telecommunication network;
   a User Equipment (UE) subscribed to the first wireless communication network; and
   a second wireless communication network, wherein there is an absence of a roaming capability between the first wireless telecommunications network and the second wireless telecommunications network for the UE;
   wherein the first wireless telecommunication network comprises a processor configured to:
      generate a network key for authenticating the UE at the second wireless telecommunications network, and
      communicate the generated network key to the UE by a System Information Broadcast (SIB); and
   wherein the second wireless telecommunication network comprises a processor configured to:
      receive the generated network key from the first wireless telecommunication network, and
      subsequently, to receive the generated network key from the UE, thereby to authenticate the UE at the second wireless telecommunications network so as to permit the UE to subscribe to the second wireless telecommunications network.

* * * * *